United States Patent
Lu et al.

(10) Patent No.: US 9,652,223 B2
(45) Date of Patent: May 16, 2017

(54) METHOD AND APPARATUS FOR EXECUTING INTEGRATED APPLICATION PROGRAM

(71) Applicant: TENCENT TECHNOLOGY (SHENZHEN) COMPANY LIMITED, Shenzhen (CN)

(72) Inventors: Haiyang Lu, Shenzhen (CN); Xu Zhang, Shenzhen (CN); Decheng Wang, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 118 days.

(21) Appl. No.: 14/678,463

(22) Filed: Apr. 3, 2015

(65) Prior Publication Data

US 2015/0212810 A1 Jul. 30, 2015

Related U.S. Application Data

(63) Continuation of application No. PCT/CN2013/084843, filed on Oct. 8, 2013.

(30) Foreign Application Priority Data

Oct. 12, 2012 (CN) .......................... 2012 1 0385730

(51) Int. Cl.
*G06F 9/44* (2006.01)
*G06F 11/00* (2006.01)
(Continued)

(52) U.S. Cl.
CPC ............ *G06F 8/68* (2013.01); *G06F 3/04817* (2013.01); *G06F 9/542* (2013.01); *G06F 11/006* (2013.01)

(58) Field of Classification Search
None
See application file for complete search history.

(56) References Cited

U.S. PATENT DOCUMENTS 6,594,709 B1 * 7/2003 Agasaveeran ............ G06F 9/54
  370/235
6,633,313 B1 * 10/2003 Cirne ..................... G06F 9/542
  715/733

(Continued)

FOREIGN PATENT DOCUMENTS

| CN | 1804805 A | 7/2006 |
|---|---|---|
| CN | 101729584 A | 6/2010 |
| WO | 2007077020 A1 | 7/2007 |

OTHER PUBLICATIONS

Yang et al., "Data Service Portal for application integration in cloud computing," 2011, 8th International Conference & Expo on Emerging Technologies for a Smarter World (CEWIT), pp. 1-3.*

(Continued)

*Primary Examiner* — Thuy Dao
*Assistant Examiner* — Stephen Berman
(74) *Attorney, Agent, or Firm* — Anova Law Group, PLLC

(57) ABSTRACT

The present disclosure provides methods and apparatus for executing integrated application programs. An implementation class of an instantiation application program is executed in a first process, to obtain a context of a first application program including a first identifier. Or an implementation class of an instantiation application program is executed in a second process, to obtain a context of a second application program including a second identifier. It is determined whether an identifier corresponding to a current process is the first identifier or the second identifier. If the identifier corresponding to the current process is the first identifier, the first application program is executed when an initialization (Continued)

starts. Or, if the identifier corresponding to the current process is the second identifier, the second application program is executed when an initialization starts.

13 Claims, 7 Drawing Sheets

(51) Int. Cl.
*G06F 3/0481* (2013.01)
*G06F 9/54* (2006.01)

(56) References Cited

U.S. PATENT DOCUMENTS

| | | | | |
|---|---|---|---|---|
| 9,052,820 | B2* | 6/2015 | Jarrett | G06F 9/4443 |
| 2002/0140744 | A1* | 10/2002 | Kanevsky | G06F 3/04817 |
| | | | | 715/839 |
| 2003/0051068 | A1* | 3/2003 | Eldridge | G06F 9/4428 |
| | | | | 719/318 |
| 2005/0183096 | A1* | 8/2005 | Branigan | G06F 9/542 |
| | | | | 719/328 |
| 2005/0289510 | A1* | 12/2005 | Illowsky | G06F 1/3203 |
| | | | | 717/107 |
| 2006/0041881 | A1* | 2/2006 | Adkasthala | G06F 8/68 |
| | | | | 717/168 |
| 2009/0254601 | A1* | 10/2009 | Moeller | G06F 9/542 |
| | | | | 709/201 |
| 2010/0077347 | A1* | 3/2010 | Kirtane | G06F 9/4443 |
| | | | | 715/803 |
| 2013/0024850 | A1* | 1/2013 | Nutaro | G06F 8/68 |
| | | | | 717/169 |
| 2013/0346589 | A1* | 12/2013 | Leshko | G06F 9/542 |
| | | | | 709/224 |
| 2014/0013336 | A1* | 1/2014 | Yang | G06F 9/54 |
| | | | | 719/313 |

OTHER PUBLICATIONS

Steel, "A Web Services-based system for ad-hoc mobile application integration," 2003, ITCC 2003. International Conference on Information Technology: Coding and Computing [Computers and Communications], pp. 1-5.*

Stal, "Web services: beyond component-based computing," 2002, Communications of the ACM, vol. 45, Issue 10, pp. 71-76.*

The World Intellectual Property Organization (WIPO) International Search Report for PCT/CN2013/084843 Jan. 2, 2014.

* cited by examiner

METHOD AND APPARATUS FOR EXECUTING INTEGRATED APPLICATION PROGRAM

CROSS-REFERENCES TO RELATED APPLICATIONS

This application is a continuation of PCT Application No. PCT/CN2013/084843, filed on Oct. 8, 2013, which claims priority to Chinese Patent Application No. CN201210385730.9, filed on Oct. 12, 2012, the entire contents of all of which are incorporated herein by reference.

FIELD OF THE TECHNOLOGY

The present invention relates to computer technologies, and in particular, relates to methods and apparatus for executing an integrated application program.

BACKGROUND OF THE DISCLOSURE

After development of an application program is completed, the initially developed application program is improved by adding a new function, so as to better satisfy requirements of a user. In order to improve the development efficiency, a program development engineer integrates multiple application programs together.

Generally, the program development engineer integrates application programs in two manners. The first manner is integrating application programs in a manner of packaging a software development kit (SDK), and the second manner is integrating application programs in a code-level multiplexing manner.

The manner of packaging an SDK refers to independently developing an SDK tool by using an existing application program, to provide a corresponding functional interface to a party needing integration and multiplexing. Advantages of this manner are that integration requirements may be satisfied, and a development workload of an integrating party is very small; while, disadvantages are that an integrated party needs to invest in development and maintain a resource of the SDK, and is not flexible enough, and an SDK of a new version is needed when a new function is added. In addition, a compatibility problem of SDK updating further needs to be considered, and SDK operating efficiency optimization is also a difficult problem. As a development team of three application programs, corresponding labor resources and time resources need to be invested in maintaining an SDK used for integration, development costs are large, and integration is hard to implement.

In the code-level multiplexing manner, a party needing integration and multiplexing develops a function the same as that of an integrated party. Compared with the first manner, the second manner may optimize a code structure and program execution efficiency and stability to a larger extent. The integrated party has a small workload. However, in the second manner, development and maintenance costs invested by an integrating party are excessively large, the second manner is not flexible enough, and when a new function is added, the integrating party needs to synchronously develop the new function with the integrated party.

Therefore, there is a need to solve technical problems in the computer technology to efficiently and effectively integrate application programs and to generate an integrated application.

SUMMARY

In view of the above, it is necessary to provide an application program integration method and apparatus, which can conveniently integrate different application programs, so as to improve the development efficiency of an application program and reduce development cost.

One aspect or embodiment of the present disclosure provides a method for executing an integrated application program. The method includes the following steps: executing an implementation class of an instantiation application program in a first process, to obtain a context of a first application program, or instantiating an implementation class of an instantiation application program in a second process, to obtain a context of a second application program, the context of the first application program including a first identifier corresponding to the first application program and the context of the second application program including a second identifier corresponding to the second application program; determining whether an identifier corresponding to a current process is the first identifier or the second identifier; and if the corresponding identifier is the first identifier, executing the first application program when an initialization starts, or, if the corresponding identifier is the second identifier, executing the second application program when an initialization starts.

Another aspect or embodiment of the present disclosure provides an apparatus for executing an integrated application program. The apparatus includes a creation module and an initialization module. The creation module is configured to execute an implementation class of an instantiation application program in a first process, to obtain a context of a first application program, and configured to execute an instantiation implementation class of an application program in a second process, to obtain a context of a second application program. The context of the first application program includes a first identifier corresponding to the first application program, and the context of the second application program includes a second identifier corresponding to the second application program. The initialization module is configured to determine whether an identifier corresponding to a current process is the first identifier or the second identifier, and if the identifier corresponding to the current process is the first identifier, to execute the first application program when initialization starts, or, if the identifier corresponding to the current process is the second identifier, to execute the second application program when initialization starts.

Another aspect or embodiment of the present disclosure provides a method for generating an integrated application program by instantiating an implementation class of an application program, to obtain a context of a first application program. The instantiating to obtain the context of the first application program is executed in a first process and the context of the first application program includes a first identifier corresponding to the first application program. An implementation class of an application program is instantiated to obtain a context of a second application program. The instantiating to obtain the context of the second application program is executed in a second process and the context of the second application program includes a second identifier corresponding to the second application program.

Various embodiments also include an application program integration method by instantiating an implementation class of an application program in a first process, to obtain a context of a first application program, and storing a first identifier corresponding to the first application program in the context of the first application program; instantiating an implementation class of an application program in a second process, to obtain a context of a second application program, and storing a second identifier corresponding to the second application program in the context of the second application program; and separately performing initialization operations according to the context of the first application program and the context of the second application program. The initialization operations include: separately executing a different initialization code according to the first identifier and the second identifier.

Various embodiments further include an application program integration apparatus includes: a creation module, configured to instantiate an implementation class of an application program in a first process to obtain a context of a first application program, and to store a first identifier corresponding to the first application program in the context of the first application program; and further configured to instantiate an implementation class of an application program in a second process to obtain a context of a second application program, and to store a second identifier corresponding to the second application program in the context of the second application program. The apparatus also include an initialization module, configured to separately perform initialization operations according to the context of the first application program and the context of the second application program. The initialization operations includes: separately executing different initialization code according to the first identifier and the second identifier.

In the disclosed application program integration methods and apparatus, a current process is marked when creating different application program instances, and different operating environments may be constructed in an initialization operation, so that application programs having different functions may be realized by using a same application program installation package. Therefore, a process of integrating different application programs into a same application program installation package is greatly simplified, the development efficiency of integrating different application programs is improved, and development time is reduced.

Further, because the different functions of an application program are distributed in different processes, a single process may be prevented from being cleaned by a process clean mechanism of a system due to occupation of excessively large memory, and application operating stability is improved.

Other aspects or embodiments of the present disclosure can be understood by those skilled in the art in light of the description, the claims, and the drawings of the present disclosure.

BRIEF DESCRIPTION OF THE DRAWINGS

The following drawings are merely examples for illustrative purposes according to various disclosed embodiments and are not intended to limit the scope of the present disclosure. The embodiments of the present invention are described below with reference to the accompanying drawings. In these accompanying drawings.

DESCRIPTION OF EMBODIMENTS

Reference will now be made in detail to exemplary embodiments of the disclosure, which are illustrated in the accompanying drawings. Wherever possible, the same reference numbers will be used throughout the drawings to refer to the same or like parts.

Figure 1:
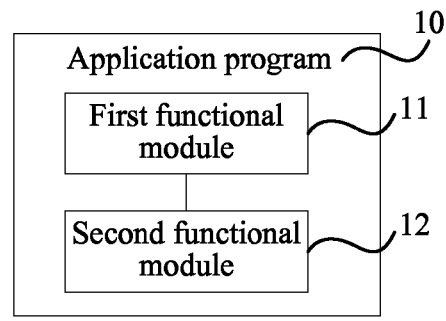
FIG. 1 is a block diagram of an internal structure of an application program according to an exemplary embodiment of the present invention.

FIG. 1 is a block diagram of an internal structure of an application program according to an exemplary embodiment of the present invention. As shown in FIG. 1, the application program 10 includes a first functional module 11 and a second functional module 12.

The first functional module 11 and the second functional module 12 separately correspond to different program packages, that is, if installation is performed according to the foregoing different program packages, a first application and a second application may be separately obtained, and the first functional module and the second functional module are respectively replaced by the first application and second application in the following.

Figure 2:
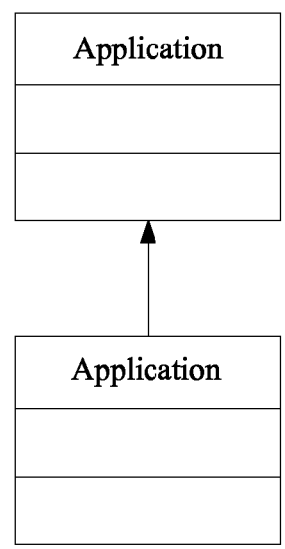
FIG. 2 is a schematic diagram of an internal inheritance relationship of application programs in FIG. 1 according to an exemplary embodiment of the present invention.

Generally, an application can only have a single entry, that is, an implementation class of the application. By using an Android operating system as an example, an implementation class of an application refers to an implementation class of android.app.application, and most of application programs place much service logical code in the implementation class of the android.app.application. In order to implement integration of the first application and the second application, as shown in FIG. 2, an implementation class of the second application may be enabled to inherit an implementation class of the first application. In such a manner, code in the first application may be directly multiplexed, so as to implement integration of the first application and the second application.

In addition, an implementation class of an application (or application program) is the first to be instantiated when running the application, and therefore, many initialization operations of the application are performed by using the implementation class of the application. On the other hand, the first application and the second application may have different requirements on an operating environment. In other words, different operating environments need to be constructed when the first application and the second application are initialized.

Figure 3:
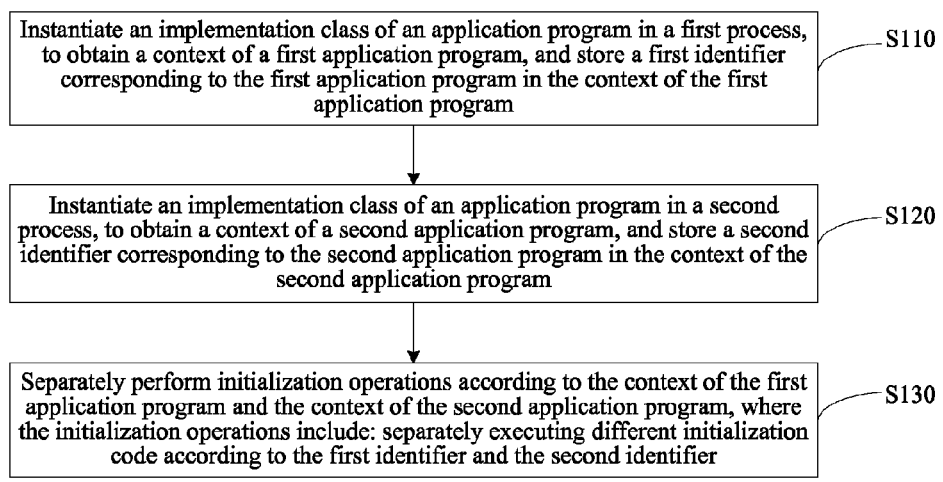
FIG. 3 is a schematic flowchart of an application program integration method according to a first exemplary embodiment of the present invention.

FIG. 3 is a schematic flowchart of an application program integration method according to a first exemplary embodiment in the present disclosure. As shown in FIG. 3, the method includes:

Step S110: instantiating an implementation class of an application program in a first process, to obtain a context of a first application program, and storing a first identifier corresponding to the first application program in the context of the first application program; and Step S120: instantiating an implementation class of an application program in a second process, to obtain a context of a second application program, and storing a second identifier corresponding to the second application program in the context of the second application program.

In an exemplary default situation, all components of a same application program can run in a same process, which often occurs to most application programs. However, some components may be specified to run in different processes by modifying a configuration file of an application program, for example, by modifying AndroidManifest.xml of an Android application program. All standard components <activity>, <service>, <receiver>, and <provider> set in a corresponding configuration file may independently run in one process specified by android:process. A component may independently run in a process, and independently occupy a resource; or, several components may run in one process, and share a resource more conveniently. Certainly, for an overall label of an application program, android:process attribute may also be set to develop default processes in which the four components may run.

The Android system may generally keep a process survival to the greatest extent. However, an old process eventually needs to be destroyed for update, and a more important process releases a memory resource. Priorities of processes are shown from high to low in the following Table 1.

In addition, the Android system recycles, according to the priorities shown in Table 1 and according to a descending order of sizes of occupied resources, memory occupied by a process. In other words, larger occupied memory is recycled more easily. Therefore, process separation can reduce memory occupation of a single process, and stability of a background process is improved.

TABLE 1

| Foreground process | Process of an interface (a process operated or paused by a user) |
| --- | --- |
| | Service process bound by an interface being operated |
| | Service process declared to be the foreground |
| | Service process executing a creation, start, and destruction method |
| | Process executing a receiving method in a broadcast receiver |
| Visual process | Process including switching an interface to the background |
| | Service process bound by a visual interface |
| Background process and null process | |
| A stopping method is invoked in a process, and there is no direct interaction with a user. | |
| There is no active activity, service, receiver, or provider of any event in a process. | |

It may be understood that, when an application program is not operated, the application program refers to a program file installed in a memory, and when the application program is operated, starting of the application program refers to executing the foregoing program file to instantiate the application program in the memory. When the application program is started, an implementation class of "android.app.application" is first instantiated to obtain a context of the application program, and in the implementation class of the "android.app.application", a method that is the first to be invoked is "application.onCreate".

In this method, initialization operations of all resources need to be performed. In step S110 and step S120, a process that is currently running is marked in the "application.onCreate" method, and an implementation manner is, for example, acquiring a package name corresponding to a serial number (PID) of a current process and a package name of a main program.

Step S130: includes separately performing initialization operations according to the context of the first application program and the context of the second application program. The initialization operations include: separately executing different initialization code according to the first identifier and the second identifier.

It may be understood that, the first application program and the second application program are obtained by instantiating a same piece of program code, but different operating environments need to be constructed for the first application program and the second application program. In step S130, whether the current process is a process of the first application program or a process of the second application program is distinguished by identifying the first identifier and the second identifier, so as to execute different initialization code, to complete construction of different operating environments.

By constructing the different operating environments, the first application program and the second application program are represented as two completely independent application programs, but program files of the first application program and the second application program only exist in an installation package of a same application program.

It may be understood that, a function of the first application program may be correlated with a function of the second application program. Therefore, communication needs to be performed between the first application program and the second application program. By using the Android system as an example, communication between different processes may be implemented in the following two manners:

1. Content Provider

Figure 4:
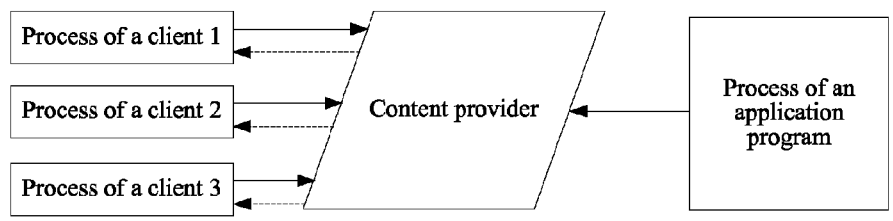
FIG. 4 is a schematic diagram of a principle of a content provider according to various embodiments of the present invention.

The content provider is a standard component provided by an Android application program, and is used for accessing a database. The content provider is mostly used for cross-process access of an application program. In an installation process, the application program publishes a declared content provider (or data access interface provider), and a program outside the process, as a client of the content provider, may perform access by using a standard format (such as a URI). A content provider, as a service provider, needs to return a database cursor to the client. The client may read an agreed field from the database cursor, as shown in FIG. 4.

2. Broadcast and Broadcast Receiver

Broadcast is a standard mechanism for transmitting information between application programs. The broadcast receiver is a type of component for filtering, receiving, and responding to a sent broadcast. An application program (such as a first application program) may broadcast a notification carrying data, and if following (registering) the notification, a program of another process (such as a second application program) receives the packet by using an implementation of the broadcast receiver, and parses and responds to corresponding service logic as agreed, as shown in FIG. 5.

Figure 5:
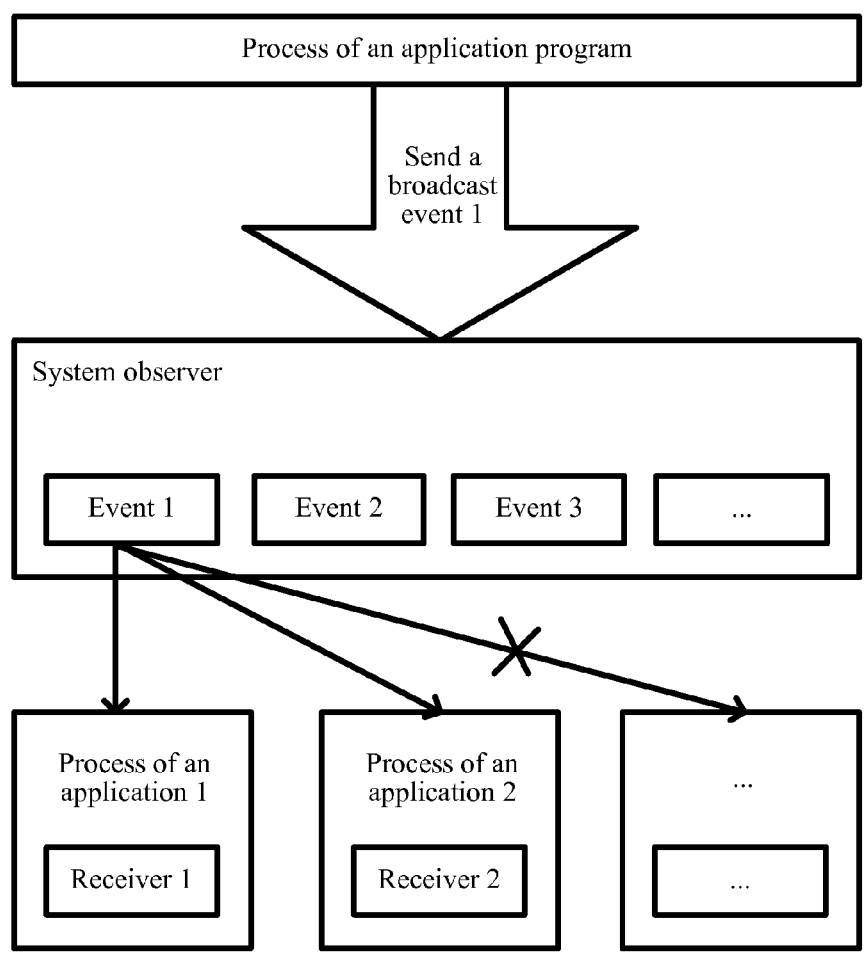
FIG. 5 is a schematic diagram of principles of broadcast and a broadcast receiver according to various embodiments of the present invention.

In FIG. 5, a process of an application 1 and a process of an application 2 register an event 1, and when sending a broadcast, an application program pushes the data to implementations of a receiver 1 and a receiver 2, and other receiver implementations do not respond. This set of mechanism is universally used for account synchronization and transmission of state parameters between programs.

Because a large amount of communication and data sharing are needed between processes, how to ensure data security is a problem that needs to be solved. In this embodiment, a manner of combining a security mechanism of an intelligent operating system, such as an Android platform, and symmetric encryption of application-layer data may be used.

An integral security framework of the Android platform is shown in Table 2.

TABLE 2

Application layer (code security, access permission)
Application framework (signature)
SSL (network security)　Database (security)　Virtual machine (sandbox)
Kernel of an operating system (file access control)

Detailed description for Table 1 is given in the following: 1) Application layer security (code security, access security), 2) Application framework security, and 3) Network security, database security, and sandbox of a virtual machine.

1) Application Layer Security (Code Security, Access Security)

The code security may obfuscate code level by using an obfuscation tool, to prevent a code leakage loss caused by the fact that an installation package is decompiled. An obfuscator used in this embodiment is a pro-guard, and automatically obfuscates code during publishing and packaging.

The access security is mainly used to limit operations of an application, to prevent privacy leakage of a user and illegal device access that are caused by the fact that a malicious application is operated illegally. An Android access right is classified into normal, dangerous, signature, and system signature as follows:

Normal: a right for which a declaration does not need to be displayed, where access may be performed by default;

Dangerous: a more dangerous right, where a user permission is needed during access;

Signature: an accessing party and an accessed party must have a same signature; and System signature: an accessing party can perform access only when the accessing party has a signature of an operating system.

A right level of signature is used in this embodiment, which can prevent a third-party application from accessing or intercepting a sensitive data interface and data.

2) Application Framework Security

The application framework security is ensured by using a digital certificate. The digital certificate is free of charge, and includes two modes, which are a debugging mode and a publishing mode, and a greatest use is verification when an application update is published. In this embodiment, a digital certificate (signature) is used for communication verification between processes, to prevent applications having different signatures from intercepting a communications broadcast. The digital certificate is generated by using a plug-in, such as "adt" provided by the google corporation.

3) Network Security, Database Security, and Sandbox of a Virtual Machine

A commonly used key authentication manner is used in a network transmission layer, which can ensure that an authenticated user and server are both sent to a correct user and server, and can also prevent data from being stolen and ensure data integrity. A commonly used encryption manner is SSL. In this embodiment, a manner of a dynamic key cooperating with a TEA algorithm (or tiny encryption algorithm) is used.

During server access, access of a third-party illegal application to an application server is limited by using a verification form of an application ID (i.e., APPID) and a signature MD5, and data statistics is collected by using the APPID. Application access is allowed only when the APPID and a signature MD5 match a record entered by an operation platform.

For a database, a symmetric encryption algorithm is used to encrypt content, a content provider uses a solution manner of access security, an access permission level of the content provider is updated to the signature, and applications having different signatures are not allowed to access the database interface. In addition, a sandbox mechanism of the virtual machine also ensures data security inside a process. The sandbox is a set of precise security model designed for data security and system security of the security model, and in consideration of security, limitation is made on operations of the application layer.

By using an Android system as an example, an icon of an application program in a latest taskbar is allocated according to a task, and in a default situation, different instances of a same application program belongs to a same task, that is, in a default start manner, after creation, the first application program and the second application program only have one icon ingress. Because a task in a system is processed in a stack structure, the icon ingress in the latest taskbar can only be used for accessing a second application program that is created afterwards.

Therefore, in order to create icons that are in the latest taskbar and separately correspond to the first application program and the second application program, a start manner of the application program needs to be changed. In a configuration file (AndroidManifest.xml) of the application program, "android:launchMode" is configured to be "singleTask" or "singleInstance". Further, different icons are configured for default activities of the first application program and the second application program.

In this way, in the latest taskbar, icons of different application programs may be separately displayed for the first application program and the second application program. After a user selects the icon, the first application program or the second application program is correspondingly invoked. Invoking the first application program or the second application program is, for example, displaying an interface of the default activity of the first application program or the second application program.

In the exemplary application program integration method according to one embodiment, a current process is marked when different application program instances are created, and different operating environments may be constructed in an initialization operation, so that application programs having different functions may be implemented by using a same application program installation package. Therefore, a process of integrating different application programs into a same application program installation package is greatly simplified, the development efficiency of integrating different application programs is improved, and development time is reduced.

Further, because different functions of an application program are distributed in different processes, a single process may be prevented from being cleaned by a process clean mechanism of a system due to occupation of excessively large memory, and application operating stability is improved.

Various embodiments also provide a method for executing an integrated application program. The method includes the following steps: executing an implementation class of an instantiation application program in a first process, to obtain a context of a first application program, or instantiating an implementation class of an instantiation application program in a second process, to obtain a context of a second application program, the context of the first application program including a first identifier corresponding to the first application program and the context of the second application program including a second identifier corresponding to the second application program; determining whether an identifier corresponding to a current process is the first identifier or the second identifier; and if the corresponding identifier is the first identifier, executing the first application program when an initialization starts, or, if the corresponding identifier is the second identifier, executing the second application program when an initialization starts.

Figure 6:
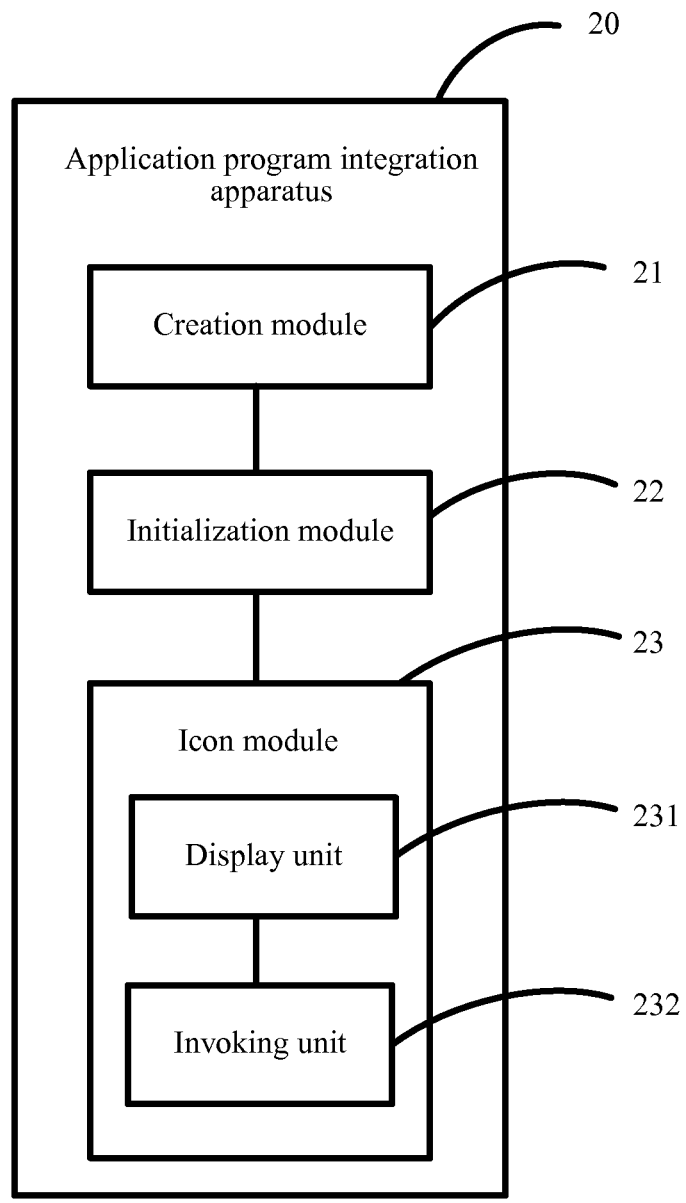
FIG. 6 is a block diagram of a structure of an application program integration apparatus according to a second exemplary embodiment of the present invention.

FIG. 6 is a block diagram of a structure of an application program integration apparatus according to a second exemplary embodiment. As shown in FIG. 6, the application program integration apparatus 20 includes a creation module 21 and an initialization module 22.

The creation module 21 is configured to instantiate an implementation class of an application program in a first process, to obtain a context of a first application program, and store a first identifier corresponding to the first application program in the context of the first application program. The creation module 21 is further configured to instantiate an implementation class of an application program in a second process, to obtain a context of a second application program, and store a second identifier corresponding to the second application program in the context of the second application program. The first identifier and the second identifier separately are, for example, names of application program packages corresponding to the first process and the second process; and The initialization module 22 is configured to separately perform initialization operations according to the context of the first application program and the context of the second application program. The initialization operations include: separately executing different initialization code according to the first identifier and the second identifier.

The application program integration apparatus 20 may further include an icon module 23, and the icon module 23 includes a display unit 231 and an invoking unit 232. The display unit 231 is configured to separately display different application program icons for the first application program and the second application program; and the invoking unit 232 is configured to correspondingly invoke the first application program or the second application program according to an icon selected by a user.

The first process and the second process separately have content providers of the first application program and the second application program, and the content providers are configured to implement communication between the first application program and the second application program.

The first application program includes a registration unit, configured to register a first broadcast event in the first process; the second application program includes an event sending unit, configured to send, in the second process, an instance of the first broadcast event; and the first application program further includes an event receiver, configured to receive, in the first process, the instance of the first broadcast event. For other details of the application program integration apparatus 20, reference may further be made to FIG. 3 and related description.

In the application program integration apparatus according to this embodiment, a current process is marked when different application program instances are created, and different operating environments may be constructed in an initialization operation, so that application programs having different functions may be implemented by using a same application program installation package. Therefore, a process of integrating different application programs into a same application program installation package is greatly simplified, the development efficiency of integrating different application programs is improved, and development time is reduced.

Further, because different functions of an application program are distributed in different processes, a single process may be prevented from being cleaned by a process clean mechanism of a system due to occupation of excessively large memory, and application operating stability is improved.

Figure 7:
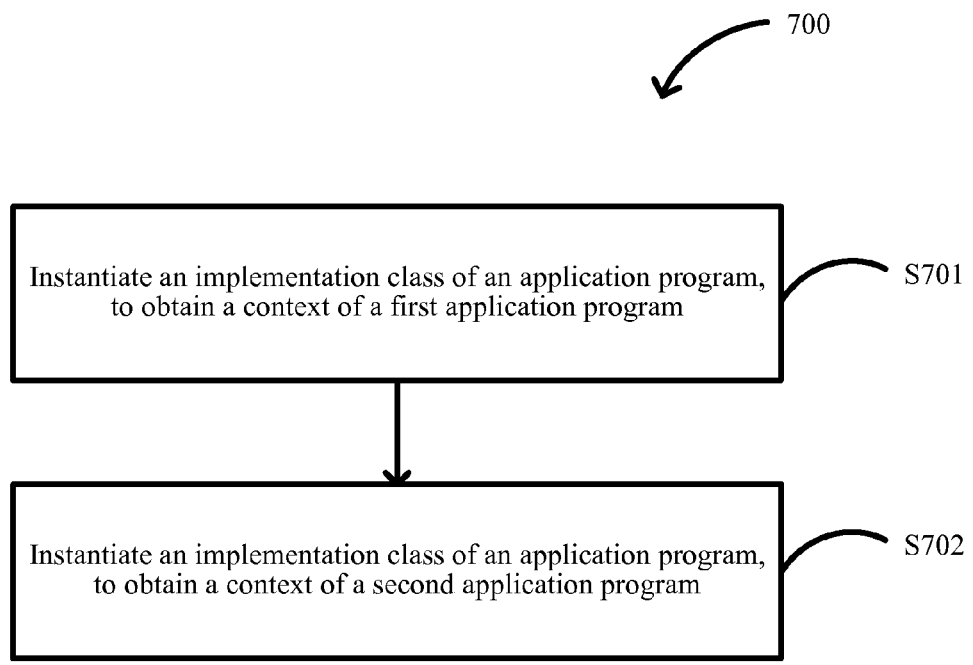
FIG. 7 shows a flowchart of a method for generating an integrated application program according to an exemplary embodiment of the present invention.

In one embodiment, the present disclosure provides an integrated application program generating method. FIG. 7 shows a flowchart of the integrated application program generating method 700 according to this embodiment of the present invention. Steps of the method 700 are described with reference to FIG. 7.

In step S701, an implementation class of an application program is instantiated, to obtain a context of a first application program. The first application program may be included in a source application program.

For example, the source application program may be a QQ main program, and the first application program may be a chat program for implementing a chat function. In one embodiment, the implementation class of the application program may be an implementation class of "android.app.application". In one embodiment, the instantiating an implementation class of an application program, to obtain a context of a first application program is performed in the first process. The context of the first application program may include a first identifier corresponding to the first application program.

In step S702, an implementation class of an application program is instantiated, to obtain a context of a second application program. For example, the second application program may be a camera drive program that implements a photographing or video function. In one embodiment, the instantiating an implementation class of an application program, to obtain a context of a second application program is performed in a second process. The context of the second application program may include a second identifier corresponding to the second application program. Because the first process and the second process are marked by using the first identifier and the second identifier, the first process and the second process may be effectively distinguished when an integrated application program is executed. Because the integrated application program is executed by using two processes, a single process may be prevented from being cleaned by a process clean mechanism of a system due to occupation of excessively large memory.

Preferably, the first identifier may include a name of an application program package corresponding to the first process and the second identifier may include a name of an application program package corresponding to the second process. In one embodiment, the first identifier may be, for example, a package name corresponding to a serial number (PID) of the first process and a package name of a main program. The second identifier may be, for example, a package name corresponding to a serial number (PID) of the second process and the package name of the main program.

Figure 8:
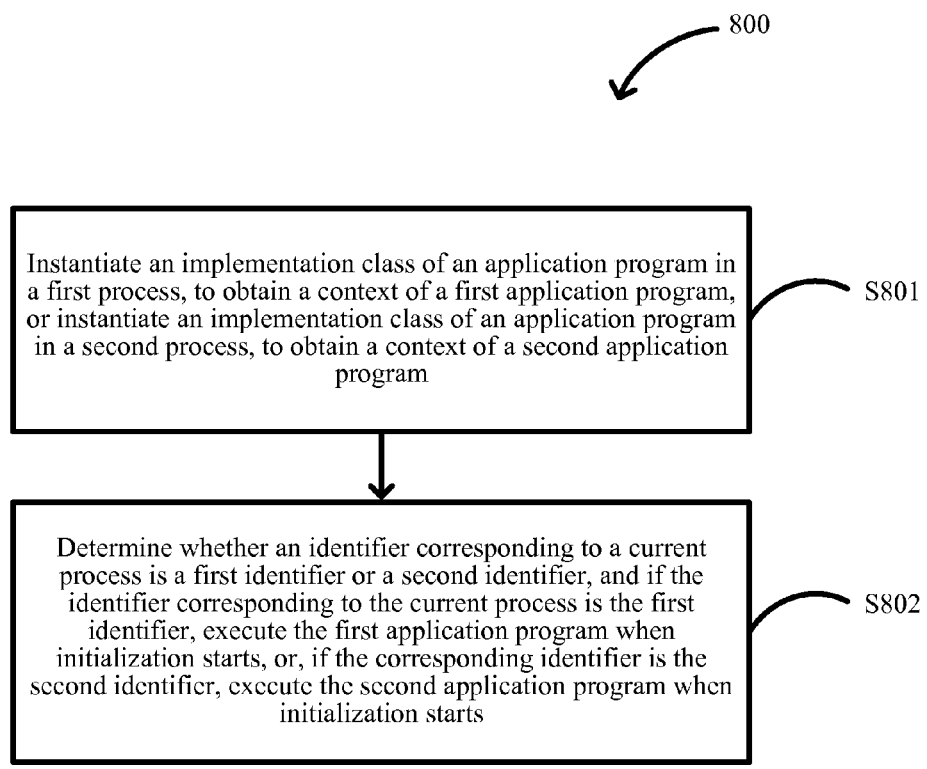
FIG. 8 shows a flowchart of a method for executing an integrated application program according to an exemplary embodiment of the present invention.

In one embodiment, the present disclosure further provides a method for executing an integrated application program. FIG. 8 shows a flowchart of an exemplary method 800 for executing the integrated application program according to this embodiment of the present invention.

The method 800 includes the following steps: step S801: instantiating an implementation class of an application program in a first process, to obtain a context of a first application program, or instantiating an implementation class of an application program in a second process, to obtain a context of a second application program. The context of the first application program includes a first identifier corresponding to the first application program, and the context of the second application program includes a second identifier corresponding to the second application program; and step S802: determining whether an identifier corresponding to a current process is the first identifier or the second identifier, and if the identifier corresponding to the current process is the first identifier, executing the first application program when initialization starts, or, if the corresponding identifier is the second identifier, executing the second application program when initialization starts.

Preferably, the first identifier includes a name of an application program package corresponding to the first process and the second identifier includes a name of an application program package corresponding to the second process.

Preferably, whether an icon of the first application program is displayed in a latest taskbar interface may be determined according to an execution situation of the first application program, or whether an icon of the second application program is displayed in a latest taskbar interface may be determined according to an execution situation of the second application program.

Preferably, the first application program or the second application program is re-executed or further executed according to an icon selected by a user. In one embodiment, after a period of time after the user starts and executes the first application program, the first application program is closed. The icon of the first application program corresponding to the first application program may be created and displayed in the latest taskbar interface. The user may restart and re-execute the first application program by clicking the icon of the first application program. In another embodiment, after a period of time after the user starts and executes the first application program, the user starts and executes another application program and keeps the first application program running in the background. The icon of the first application program corresponding to the first application program may be created and displayed in the latest taskbar interface. The user may further execute the first application program by clicking the icon of the first application program.

Preferably, the icon of the first application program is different from the icon of the second application program, which helps the user to distinguish the icon of the first application program and the icon of the second application program, thereby avoiding obfuscation.

Preferably, the method 800 further includes the following steps: after executing the first application program when initialization starts or executing the second application program when initialization starts, determining that an application program corresponding to a subsequent process is an application program that is not executed when initialization starts, and executing, when initialization starts, the application program that is not executed when initialization starts.

For example, after a QQ main program including a chat program and a camera drive program is started, the chat program is started first, an application program corresponding to a current process is the chat program, and an initialization operation is performed on the chat program. Then, the camera drive program is started, an application program corresponding to a subsequent program is the camera drive program. It is determined that the camera drive program is not executed when initialization starts, and an initialization operation is performed on the camera driver program.

Preferably, the first process communicates with the second process by using a content provider. Referring to FIG. 4 and related description of FIG. 4, a manner of performing communication by using the content provider may be understood, and no further details are provided herein again.

Preferably, the first process communicates with the second process by using the following steps. The first application program registers a first broadcast event in the first process. The second application program sends, in the second process, an instance of the first broadcast event. The first application program receives, in the first process by using a broadcast receiver, the instance of the first broadcast event. Referring to FIG. 5 and related description of FIG. 5, an operating manner of the broadcast receiver and a manner of performing communication by using broadcast may be understood, and no further details are provided herein again.

In addition, an embodiment of the present invention further provides a computer readable storage medium, where the computer readable storage medium stores a computer executable instruction. The computer readable storage medium is, for example, a nonvolatile or non-transitory memory such as an optical disc, a hard disk, or a flash memory. The computer executable instruction is used for enabling a computer or a similar operation apparatus to perform various application program integration operations in the disclosed various embodiments.

In one embodiment, the present disclosure further provides a non-transitory computer program product including executable program code used for generating an integrated application program. The executable program code may be used for: when execution is performed, instantiating an implementation class of an application program, to obtain a context of a first application program, and instantiating an implementation class of an application program, to obtain a context of a second application program. The instantiating of an implementation class of an application program, to obtain a context of a first application program is performed in a first process. The context of the first application program includes a first identifier corresponding to the first application program. The instantiating of an implementation class of an application program, to obtain a context of a second application program is performed in a second process. The context of the second application program includes a second identifier corresponding to the second application program.

Finally, the present disclosure provides an integrated application program generating system, including a processor and a memory. The memory stores executable code. The executable code may be used for: when the processor performs execution, instantiating an implementation class of an application program, to obtain a context of a first application program, and instantiating an implementation class of an application program, to obtain a context of a second application program. The instantiating an implementation class of an application program, to obtain a context of a first application program is performed in a first process. The context of the first application program includes a first identifier corresponding to the first application program. The instantiating an implementation class of an application program, to obtain a context of a second application program is performed in a second process. The context of the second application program includes a second identifier corresponding to the second application program.

Figure 9:
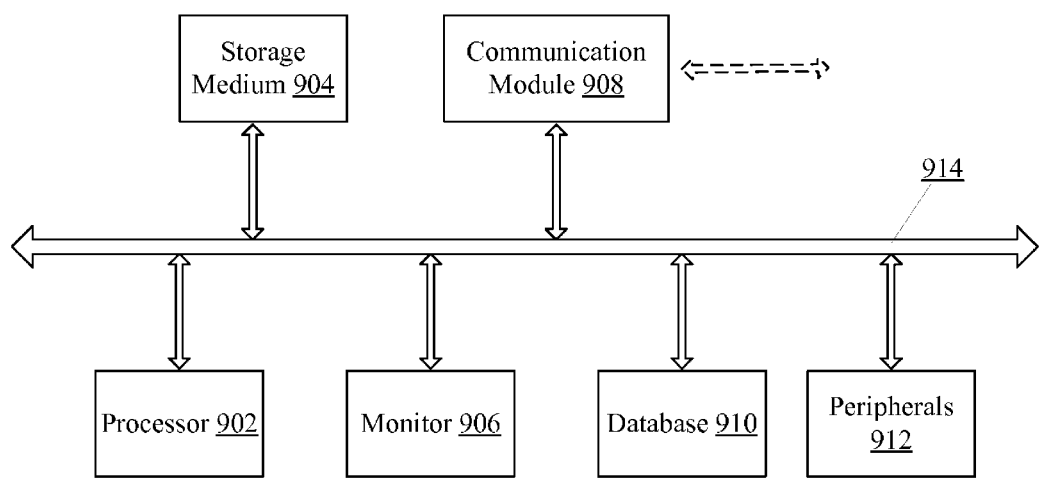
FIG. 9 illustrates an exemplary computing device consistent with the disclosed embodiments.

For example, FIG. 9 illustrates an exemplary computing device capable of implementing the disclosed methods, consistent with the disclosed embodiments. The exemplary computing device may include the disclosed apparatus.

As shown in FIG. 9, the exemplary computing device 900 may include a processor 902, a storage medium 904, a monitor 906, a communication module 908, a database 910, peripherals 912, and one or more bus 914 to couple the devices together. Certain devices may be omitted and other devices may be included.

Processor 902 may include any appropriate processor or processors. Further, processor 902 may include multiple cores for multi-thread or parallel processing. The processor 902 may be used to run computer program(s) stored in the storage medium 904. Storage medium 904 may include memory modules, such as ROM, RAM, and flash memory modules, and mass storages, such as CD-ROM, U-disk, removable hard disk, etc. Storage medium 904 may store computer programs for implementing various disclosed methods (e.g., methods for integrating application programs, methods for executing an integrated application program, and/or methods for generating an integrated application program), when executed by processor 902. In one embodiment, storage medium 904 may be a non-transitory computer-readable storage medium having a computer program stored thereon, when being executed, to cause the computer to implement the disclosed methods.

Further, peripherals 912 may include I/O devices such as keyboard and mouse, and communication module 908 may include network devices for establishing connections, e.g., through a communication network such as the Internet. Database 910 may include one or more databases for storing certain data and for performing certain operations on the stored data, such as webpage browsing, database searching, etc.

A person of ordinary skill in the art may understand that, the executable program code may be further used for: when the processor performs execution, performing all steps of the integrated application program generating method. For brevity, an additional function of the executable program code is not further described herein. It is noted that, code may directly enable the processor to perform a specified operation, may be compiled to enable the processor to perform a specified operation, and/or may be combined with other software, hardware, and/or firmware elements (such as a library used for implementing a standard function) to enable the processor to perform a specified operation.

Finally, it should be noted that, the above descriptions are merely preferred embodiments of the present invention, and are not intended to limit the present disclosure in any form. Although the present disclosure has been disclosed above through the preferred embodiments, the embodiments are not intended to limit the present disclosure. A person skilled in the art can make some equivalent variations, alterations or modifications to the above-disclosed technical content without departing from the scope of the technical solutions of the present disclosure to obtain equivalent embodiments. Any simple alteration, equivalent change or modification made to the above embodiments according to the technical essence of the present disclosure without departing from the content of the technical solutions of the present disclosure shall fall within the scope of the technical solutions of the present disclosure.

What is claimed is:

1. A method for executing an integrated application program, comprising:
   instantiating an implementation class of a first application program in a first process, to obtain a context of the first application program, or instantiating an implementation class of a second application program in a second process, to obtain a context of the second application program, the context of the first application program comprising a first identifier corresponding to the first application program, and the context of the second application program comprising a second identifier corresponding to the second application program, wherein the implementation class of the second application program is inherited from the implementation class of the first application program;
   determining whether an identifier corresponding to a current process is the first identifier or the second identifier; and
   if the identifier corresponding to the current process is the first identifier, performing initialization operations according to the context of the first application program, or, if the identifier corresponding to the current process is the second identifier, performing initialization operations according to the context of the second application program;
   wherein a same piece of program code is used when instantiating the implementation class of the first application program in the first process and when instantiating the implementation class of the second application program in the second process;
   wherein the method further comprises:
   determining, according to an execution situation of the first application program, whether an icon of the first application program is displayed in a latest taskbar interface, or determining, according to an execution situation of the second application program, whether an icon of the second application program is displayed in a latest taskbar interface; and
   re-executing or further executing the first application program or the second application program according to an icon selected by a user from the icons of the first and second application programs.

2. The method according to claim 1, wherein the first identifier comprises a name of an application program package corresponding to the first process and the second identifier comprises a name of an application program package corresponding to the second process.

3. The method according to claim 1, further comprising: after performing initialization operations according to the context of the first application program or performing initialization operations according to the context of the second application program,
   if an application program corresponding to a subsequent process is an application program that is not initialized, performing initialization operations according to a context of the application program that is not initialized.

4. The method according to claim 1, wherein the first process communicates with the second process by using a content provider.

5. The method according to claim 1, wherein the first process communicates with the second process by using the following steps:

registering, by the first application program, a first broadcast event in the first process;

sending, by the second application program in the second process, an instance of the first broadcast event; and receiving, by the first application program in the first process by using a broadcast receiver, the instance of the first broadcast event.

6. An apparatus for executing an integrated application program, comprising at least one processor configured to:

instantiate an implementation class of a first application program in a first process, to obtain the context of a first application program, or instantiate an implementation class of a second application program in a second process, to obtain a context of the second application program, the context of the first application program comprising a first identifier corresponding to the first application program, and the context of the second application program comprising a second identifier corresponding to the second application program, wherein the implementation class of the second application program is inherited from the implementation class of the first application program; and determine whether an identifier corresponding to a current process is the first identifier or the second identifier, and if the identifier corresponding to the current process is the first identifier, perform initialization operations according to the context of the first application program, or, if the identifier corresponding to the current process is the second identifier, perform initialization operations according to the context of the second application program;

wherein a same piece of program code is used when instantiating the implementation class of the first application program in the first process and when instantiating the implementation class of the second application program in the second process;

wherein the at least one processor is further configured to:

determine, according to an execution situation of the first application program, whether an icon of the first application program is displayed in a latest taskbar interface, or determine, according to an execution situation of the second application program, whether an icon of the second application program is displayed in a latest taskbar interface; and re-execute or further execute the first application program or the second application program according to an icon selected by a user from the icons of the first and second application programs.

7. The apparatus according to claim 6, wherein the first identifier comprises a name of an application program package corresponding to the first process and the second identifier comprises a name of an application program package corresponding to the second process.

8. The apparatus according to claim 6, wherein the at least one processor is further configured to:

after performing initialization operations according to the context of the first application program or after performing initialization operations according to the context of the second application program, if an application program corresponding to a subsequent process is an application program that is not initialized, performing initialization operations according to a context of the application program that is not initialized.

9. The apparatus according to claim 6, wherein the first process and the second process separately have content providers corresponding to the first application program and the second application program, which are used to implement communication between the first application program and the second application program.

10. The apparatus according to claim 6, wherein:

the first application program comprises a registration unit, configured to register a first broadcast event in the first process;

the second application program comprises an event sending unit, configured to send, in the second process, an instance of the first broadcast event; and the first application program further comprises a broadcast receiver, configured to receive, in the first process, the instance of the first broadcast event.

11. The method according to claim 1, wherein:

a launch mode of the first application program is configured to be a single instance mode; and a launch mode of the second application program is configured to be the single instance mode.

12. The method according to claim 1, wherein:

different pieces of codes are used for performing the initialization operations according to the context of the first application program and performing the initialization operations according to the context of the second application program.

13. The method according to claim 12, wherein:

after performing the initialization operations according to the context of the first application program and performing the initialization operations according to the context of the second application program, the first application program and the second application program are represented as two independent application programs.

* * * * *